(12) United States Patent
Corrigan et al.

(10) Patent No.: US 7,985,941 B2
(45) Date of Patent: Jul. 26, 2011

(54) SEAMLESS LASER ABLATED ROLL TOOLING

(75) Inventors: Thomas R. Corrigan, St. Paul, MN (US); Patrick R. Fleming, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 789 days.

(21) Appl. No.: 11/941,206

(22) Filed: Nov. 16, 2007

(65) Prior Publication Data
US 2009/0127238 A1 May 21, 2009

(51) Int. Cl.
*B23K 26/36* (2006.01)
(52) U.S. Cl. .............. 219/121.68; 219/121.73
(58) Field of Classification Search ............ 219/121.65, 219/121.66, 121.68, 121.69
See application file for complete search history.

(56) References Cited

U.S. PATENT DOCUMENTS

| | | | | |
|---|---|---|---|---|
| 3,701,880 A | * | 10/1972 | Rively et al. | 219/121.2 |
| 3,893,795 A | * | 7/1975 | Nauta | 425/403 |
| 4,322,600 A | * | 3/1982 | Crahay | 219/121.7 |
| 4,628,179 A | * | 12/1986 | Crahay | 219/121.68 |
| 4,758,705 A | * | 7/1988 | Hertzel et al. | 219/121.6 |
| 4,806,731 A | * | 2/1989 | Bragard et al. | 219/121.69 |
| 5,538,056 A | * | 7/1996 | Thoma | 144/342 |
| 5,632,204 A | * | 5/1997 | Lewis | 101/453 |
| 5,654,125 A | * | 8/1997 | Fan et al. | 430/306 |
| 5,826,588 A | * | 10/1998 | Forman | 128/898 |
| 6,222,157 B1 | | 4/2001 | Langille | |
| 6,285,001 B1 | | 9/2001 | Fleming | |
| 6,354,213 B1 | * | 3/2002 | Jenkins | 101/483 |
| 6,538,230 B2 | | 3/2003 | Lawson | |
| 6,568,816 B2 | | 5/2003 | Mayer | |
| 6,715,888 B1 | | 4/2004 | Raskar | |
| 7,670,727 B2 | * | 3/2010 | Kuchibhotla et al. | 430/5 |
| 2005/0058947 A1 | | 3/2005 | Rinehart | |

FOREIGN PATENT DOCUMENTS

| | | |
|---|---|---|
| EP | 0 850 702 | 7/1998 |
| JP | 2001-208993 | 1/2003 |

* cited by examiner

*Primary Examiner* — Samuel M Heinrich

(57) ABSTRACT

A system for generating a laser machined tool from a substantially cylindrical work piece. The system includes a laser producing a laser beam, a mask positioned within the laser beam for shaping the laser beam into an image, and an optical system for imaging the laser beam image onto the outer surface of the work piece. The system coordinates rotational and translation movements of the work piece with activation of the laser in order to use the laser image for ablating the outer surface of the work piece, creating microstructures within the surface of the work piece to form the cylindrical tool.

12 Claims, 2 Drawing Sheets

SEAMLESS LASER ABLATED ROLL TOOLING

BACKGROUND

Platforms have been developed for laser ablation machining for creating complex micron scale structured surface tooling on a flat polymer sheet. These platforms use excimer lasers to ablate polymer sheets that are held to a vacuum chuck. An optical train controls the laser beam and images a mask onto the surface of the polymer, ablating a pattern that is controlled by the design of the mask. These systems have proven the capability to produce a wide variety of structures with mechanical and optical properties. The structures created on these platforms can be used to create flat replicates for prototypes. Roll tools can be created from the flat tools by welding a nickel copy of the polymer into a cylindrical sleeve. Such a sleeve will have a seam in it, which can be undesirable when making films from the roll tools.

A need exists for additional ways to make a roll tool using laser ablation, in particular, a cylindrical tool without a seam.

SUMMARY

A first system, consistent with the present invention, can generate a laser machined tool from a substantially cylindrical work piece. The system includes a laser producing a laser beam and an optical system for processing the laser beam image and for imaging the processed laser beam image onto the outer surface of the work piece. The processing of the laser beam image is related to a curvature of the outer surface of the work piece and provides a way to accurately image onto a curved surface. The system rotates the work piece and uses the laser beam image for ablating the outer surface of the work piece in order to create microstructures within the surface to form a substantially cylindrical tool.

A second system, consistent with the present invention, can generate a laser machined tool from a substantially cylindrical work piece. The system includes a laser producing a laser beam and an optical system for imaging the laser beam image onto the outer surface of the work piece. The optical system provides for a deviation of less than 20 microns of the laser image in a direction perpendicular to the outer surface of the work piece. The system coordinates rotational and translation movements of the work piece with activation of the laser to use the laser image for ablating the outer surface of the work piece in order to create microstructures within the surface to form a substantially cylindrical tool.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Laser Machining System

The laser machining system can be used to create a polymer roll tool via laser ablation. As described below, a roll based laser ablation system; for example, an excimer laser, an optical system, and a work piece comprising a roll coated with a machinable material such as a polymer. The optical system can include, as described below, an optical train, a projection mask supporting system, and imaging optics. Other possible optical systems can use mirrors or holographic techniques to perform the imaging and ablation described below.

Figure 1:
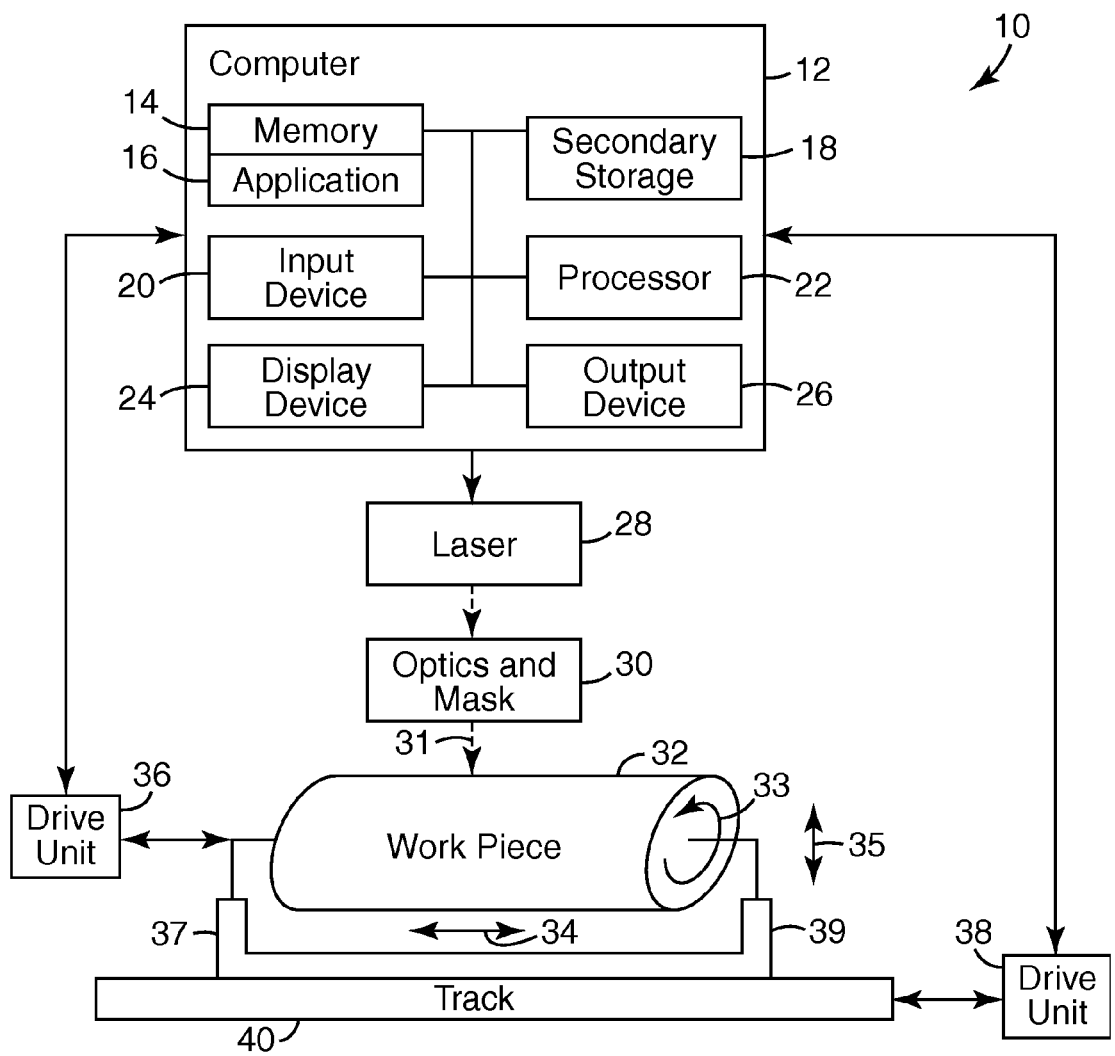
FIG. 1 is a diagram of a system for laser machining of a cylindrical work piece.

FIG. 1 is a diagram of an exemplary laser machining system 10 for machining a roll tool, referred to as a work piece. The machining can include, for example, making microstructures in the work piece. Microstructures can include any type, shape, and dimension of structures on, indenting into, or protruding from the surface of an article.

The terms "microstructure" or "microstructures" refers to structures having at least one dimension (e.g., height, length, width, or diameter) of less than 2 millimeters (mm) and more preferably less than 1 mm. Microstructures created using the system described in the present specification can have a 1000 micron pitch, 100 micron pitch, 1 micron pitch, or even a sub-optical wavelength pitch around 200 nanometers (nm). These dimensions are provided for illustrative purposes only, and microstructures made using the system described in the present specification can have any dimension within the range capable of being tooled using the system.

System 10 is controlled by a computer 12. Computer 12 has, for example, the following components: a memory 14 storing one or more applications 16; a secondary storage 18 providing for non-volatile storage of information; an input device 20 for receiving information or commands; a processor 22 for executing applications stored in memory 16 or secondary storage 18, or received from another source; a display device 24 for outputting a visual display of information; and an output device 26 for outputting information in other forms such as speakers for audio information or a printer for a hardcopy of information.

The machining of a work piece 32 is performed by an excimer laser 28 along with an optical system. The optical system in this example includes optics and projection mask 30, which selectively blocks portions of a laser beam 31 forming an image for machining a material on work piece 32. Under control of computer 12, laser 28 can provide pulses of laser beam 31. For machining of the outer surface of work piece 32, the laser, optics, and projection mask are generally held stationary while the work piece 32 rotates and translates in a direction substantially perpendicular to laser beam 31. In particular, a drive unit 36, under control of computer 12, rotates work piece 32 in a direction shown by arrow 33 or a reverse direction. For the translation of work piece 32, it is supported by mounts 37 and 39, which can move work piece laterally along a track 40 in a direction shown by arrow 34 using a drive unit 38 under control of computer 12. Mounts 37 and 39, via drive unit 38, can also be configured to move work piece in a direction substantially parallel to laser beam 31 as shown by arrow 35. The movement of work piece 32 in the direction shown by arrow 35 can be used to assist in precisely focusing the image formed by laser beam 31 onto the outer surface of work piece 32. Alternatively, the laser 28 and work piece 32 can be held stationary, except for rotation of work piece 32 as illustrated by arrow 33, while the optics and mask 30 translate along the work piece. In this alternative embodiment, system 10 can also be configured for path length compensation of the image generated by laser 28 and optics and mask 30 when they translate along work piece 32.

Figure 2:
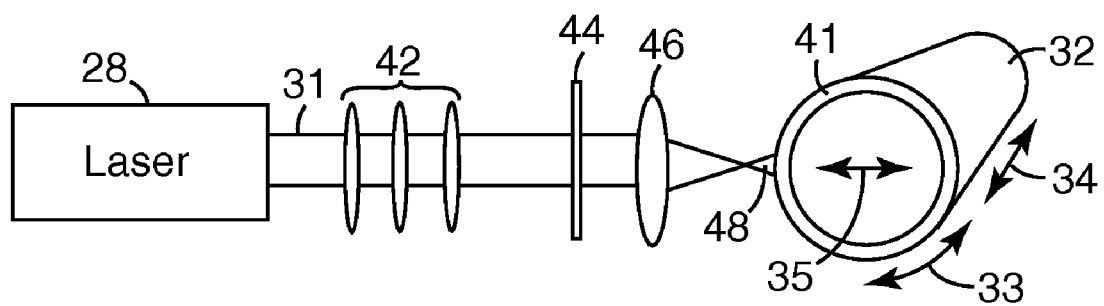
FIG. 2 is a diagram illustrating use of optics and a mask to form an image on the work piece for machining of it.

FIG. 2 is a diagram illustrating use of optics and a projection mask to form an image on the work piece for machining of it. Optics 42 provide laser beam 31 to an imaging mask 44.

Based upon a configuration of imaging mask 44, an image of laser beam 31 is provided to imaging optics 46 in order to project the image 48 onto the machinable material 41 of work piece 32. System 10 uses imaging, rather than spot writing, for machining of work piece 32. Several clear distinctions exist between spot writing and imaging. In spot writing, a system works at the focal point of a lens. In imaging, a system works at the image of a projection mask. An overlap technique is referred to as shaped spot writing, which is an imaging technique using a projection mask and imaging lens to make a simple shape with the laser beam, such as a triangle or crescent, and moving that shape to make a desired shape for machining. In spot writing, the pixel is the beam, usually round and as small as possible. In shaped spot writing, the pixel is a shaped spot, although much larger than the smallest spot possible with the laser beam. In imaging, the pixel is typically the smallest spot possible, but these pixels are all combined into one desired imaging structure for ablation.

Work piece 32 is typically implemented with a metal roll coated with a laser machinable polymeric material. The metal roll can be implemented, for example, with hard copper or with steel coated with nickel or chrome. Work piece 32 can be alternatively implemented with aluminum, nickel, steel, or plastics (e.g., acrylics) coated with the machinable polymeric material. Examples of such polymeric materials for machining are described in U.S. patent application Ser. Nos. 11/278,278 and 11/278,290, both of which were filed Mar. 31, 2006 and are incorporated herein by reference as if fully set forth. The particular material to be used may depend upon, for example, a particular desired application such as various films made using the machined work piece. The machinable polymeric material can be implemented with, for example, polyimide and urethane acrylate. A diamond-like-glass (DLG) coating can be used to make a durable tool from a laser ablated polyimide roll. DLG is described in U.S. patent application Ser. No. 11/185,078, filed Jul. 20, 2005, which is incorporated herein by reference as if fully set forth. A fluoropolymer coating can also be used to improve the durability of an ablated roll. Other materials for use as ablation substrates on a work piece include polycarbonate, urethranes, and acrylates. The durability of the roll tool (work piece) can also be increased by coating it with a thin layer of nickel, chrome, silver, or other material, which may also enhance its release characteristics.

The system can also be used to machine other materials such as nanocrystalline metals and fully dense ceramics, particularly metal oxides. However, these materials require about ten times the power for ablation in comparison to the power required to ablate polymers. Ceramics can be ablated with the system; however, it can be difficult to make a large roll of, or a roll covered with, a fully dense ceramic material. Smaller rolls of ceramic material can thus be more desirable for ablation.

The feature size that can be machined is determined by the wavelength of laser light and the numerical aperture of the imaging optics. The numerical aperture is the sine of the vertex angle of the largest cone of meridional rays that can enter or leave an optical system or element, multiplied by the refractive index of the medium in which the vertex of the cone is located.

The machining of work piece 32 is accomplished by coordinated movements of various components. In particular, the system, under control of computer 12, can control movement of work piece in directions 33, 34, and 35 via drive units 36 and 38, while coordinating those movements with control of laser 28 to provide a laser image onto the surface of work piece 32 for machining of it. The work piece surface can be stationary during the machining, or preferably it can be in motion with the electronic and laser system delays accounted for by the computer to accurately place the image in its desired location on the surface.

Work piece 32, after having been machined, can be used to make films having the corresponding microstructures for use in a variety of applications. Examples of those films include optical films, friction control films, and micro-fasteners or other mechanical microstructured components. The films are typically made using a coating process in which a material in a viscous state is applied to the work piece, allowed to at least partially solidify, and then removed. The film composed of the solidified material will have substantially the opposite structures than those in the work piece. For example, an indentation in the work piece results in a protrusion in the resulting film.

Laser Machining Process

As described above, the laser 28 and optics and projection mask 30 typically remain stationary, while the work piece 32 rotates and translates axially in directions 33 and 34, respectively. An axis of small range motion of the roll normal to the beam, direction 35, can be helpful to adjust the focus of the system. Alternatively, this adjustment can be accomplished by moving the optics, the projection mask, or both. For machining, the work piece is rotated and translated axially while computer 12 controls firing of laser 28 when work piece 32 is in the correct position. Using this technique, a 12 inch (in) diameter roll that is 24 in long can be completely patterned in only few hours for a shallow pattern.

One of the considerations for imaging on a roll based system for ablation is the trade off between resolution and depth of focus. The following equations summarize that relationship:

$$W = \frac{k_1 \cdot \lambda}{NA},$$

where W is the resolution, k1 is a constant, λ is the exposure wavelength, and NA is the numerical aperture, and $$DOF = \frac{k_2 \cdot \lambda}{NA^2},$$

where DOF is the depth of focus, k2 is a constant, and NA is the numerical aperture.

From these equations it can be determined that resolution can be improved for a given wavelength of light only by increasing the NA of the system.

Figure 3:
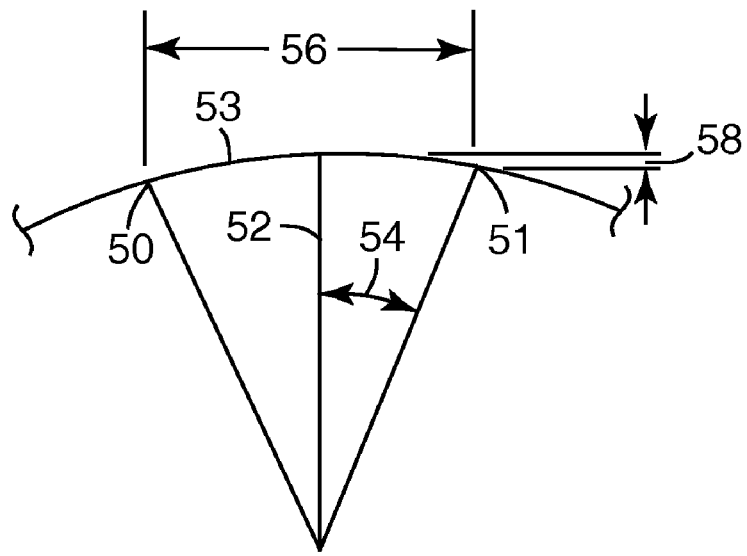
FIG. 3 is a diagram illustrating an image formed on the work piece.

Since the system 10 images onto a curved surface, a geometric analysis, based upon the diagram shown in FIG. 3, illustrates the trade offs for such a system. As shown in FIG. 3, the value ΔX (56) represents the width of the image on an outer surface 53 of the work piece between points 50 and 51. The work piece has a radius R (52), and an angle θ (54) represents half the angular distance of imaged area 56. The value ΔZ (58) represents the vertical distance of the imaged area 56 perpendicular to an outer surface of the work piece. Based upon the geometry for imaging shown in FIG. 3, ΔZ=R−R*cos(θ) and ΔX=2*R*sin(θ). Table 1 summarizes exemplary values for this geometry. For a 12 in diameter roll, an image 5 mm wide would cover a vertical distance over 20 microns (μm) making it unlikely that a suitable image could be produced with certain DOF values. In addition, it is desirable to increase the resolution of the system, which requires a reduction in the DOF.

TABLE 1

| R (in) | ΔX (mm) | ΔZ (μm) |
|---|---|---|
| 6.00 | 5.00 | 20.51 |
| 6.00 | 1.00 | 0.82 |
| 6.00 | 3.49 | 10.00 |
| 10.00 | 5.00 | 12.30 |
| 10.00 | 1.00 | 0.49 |

Several approaches are possible to address the considerations relating to imaging on a curved surface. A first approach to imaging on a curved surface involves an optical train that manipulates the excimer laser beam into a long and narrow beam (e.g., 1 mm by 20 mm) rather than the square beam (5 mm by 5 mm) conventionally used. The projection masks would then be long and narrow, but would not limit the range of patterns that can be created with the system. As shown in FIG. 3 and summarized in Table 1, a 1 mm wide beam (distance 56) that runs down the axis of the work piece would deviate less than 1 micron (distance 58) from a flat imaging plane for a 6 in diameter roll. In other cases, the optical system or projection mask can be configured to provide for an image that deviates less than 20 microns or 10 microns in a distance perpendicular to the outer surface of the work piece. Therefore, when using very large cylinders, the size of the image field in the curved direction can be limited so that the laser image remains in substantial focus for imaging with the focus error equal to ½ ΔZ (distance 58).

In a second approach, the final imaging optics can be designed to process the laser beam image in order to produce a cylindrical image plane, in which case system 10 projects a flat image from the projection mask onto a convex cylinder (the work piece). This approach curves the image field in one direction, which involves positioning cylindrical lenses in the imaging lens train. The amount of processing is typically related to an amount of curvature of the outer surface of the work piece in order to accurately project the flat (processed) image from the projection mask onto the curved surface of the work piece. Such an approach can be designed using ray tracing software, for example. Techniques for processing an image for projection onto a curved surface are described in U.S. Pat. Nos. 6,715,888 and 6,568,816, which are incorporated herein by reference as if fully set forth. This second approach of generating a curved image field is preferred for laser ablation machining in that it results in the principal rays of the laser being perpendicular to the outer surface of the cylindrical work piece such that the rays "point" to the center axis of the work piece.

A third approach involves generating a curved image field using a curved mask, such as an etched metal mask, with the amount of curvature of the mask being related to the amount of curvature of the outer surface of the work piece.

While the present invention has been described in connection with an exemplary embodiment, it will be understood that many modifications will be readily apparent to those skilled in the art, and this application is intended to cover any adaptations or variations thereof. For example, various types of lasers, imaging optics, masks, and materials to be ablated may be used without departing from the scope of the invention. This invention should be limited only by the claims and equivalents thereof.

The invention claimed is:

1. A system for generating a laser machined tool, comprising:
 a laser producing a laser beam image;
 a substantially cylindrical work piece, wherein the system is capable of rotating the work piece; and
 an optical system for processing the laser beam image and for imaging the processed laser beam image onto a convex outer surface of the work piece,
 wherein the processing of the laser beam image is related to a curvature of the outer surface of the work piece, and the processing generates a cylindrical image plane from the laser beam image with the principal rays of the laser beam image in the cylindrical image plane being substantially perpendicular to the convex outer surface of the work piece, and
 wherein the laser beam image is capable of ablating the convex outer surface of the work piece in order to create microstructures within the surface to form a substantially cylindrical tool.

2. The system of claim 1, further comprising a projection mask positioned within the laser beam for shaping the laser beam into the image.

3. The system of claim 1, wherein the system is capable of coordinating the rotational movement of the work piece with activation of the laser in order to selectively ablate the outer surface of the work piece.

4. The system of claim 3, wherein the system is capable of moving the work piece in a translational direction substantially perpendicular to the laser beam.

5. The system of claim 4, wherein the system is capable of coordinating the rotational and translation movements of the work piece with activation of the laser in order to selectively ablate the outer surface of the work piece.

6. The system of claim 1, wherein the laser beam image is capable of ablating the surface in a continuous spiral pattern on the tool.

7. The system of claim 1, wherein the laser beam image is capable of ablating the surface in a discontinuous spiral pattern on the tool.

8. The system of claim 1, further comprising a material coated on the outer surface of the work piece.

9. The system of claim 8, wherein the material comprises a polymeric material.

10. A system for generating a laser machined tool, comprising:
 a laser producing a laser beam image;
 a substantially cylindrical work piece, wherein the system is capable of rotating the work piece;
 an optical system for processing the laser beam image and for imaging the processed laser beam image onto a convex outer surface of the work piece; and
 a curved projection mask positioned within the laser beam for shaping the laser beam into the image,
 wherein the processing of the laser beam image is related to a curvature of the outer surface of the work piece, and the amount of curvature of the mask is related to an amount of curvature of the convex outer surface of the work piece in order to perform the processing, and
 wherein the laser beam image is capable of ablating the convex outer surface of the work piece in order to create microstructures within the surface to form a substantially cylindrical tool.

11. The system of claim 10, wherein the mask comprises an etched metal mask.

12. The system of claim 10, wherein the laser beam image has a deviation of less than 1 micron in a direction perpendicular to the convex outer surface of the work piece.

* * * * *